Aug. 10, 1943.  J. P. BURKE  2,326,285
NUT RETAINER
Filed Nov. 23, 1938  2 Sheets-Sheet 1
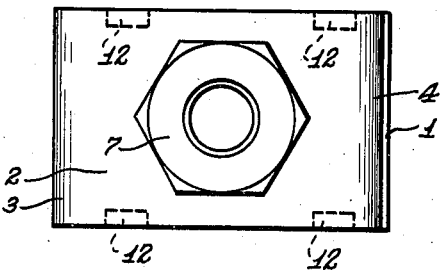
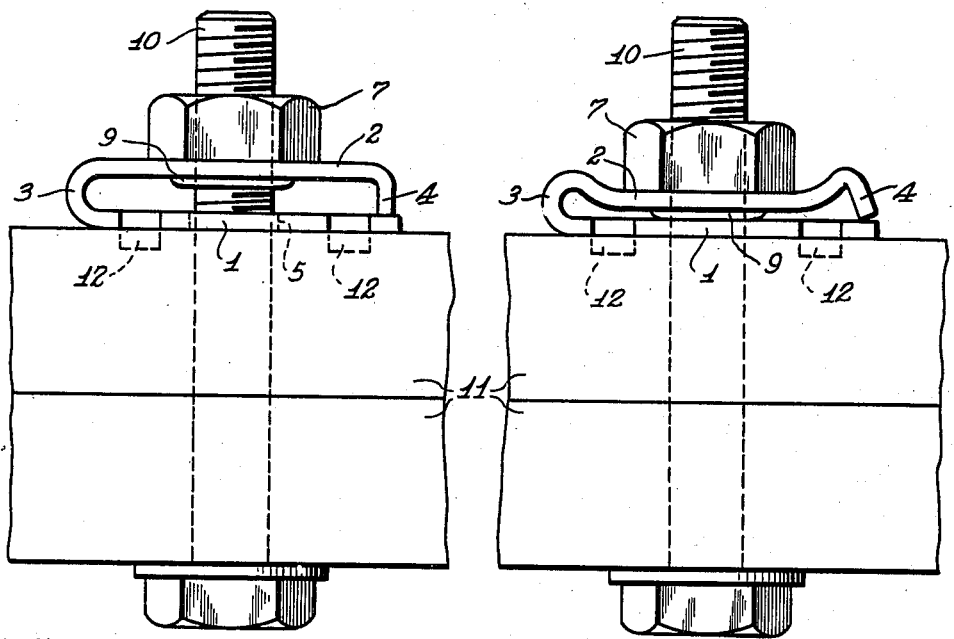
Fig. 2.  Fig. 3.
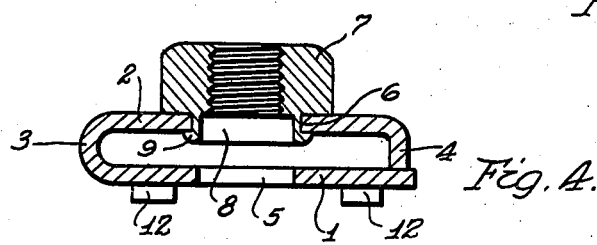
Fig. 4.
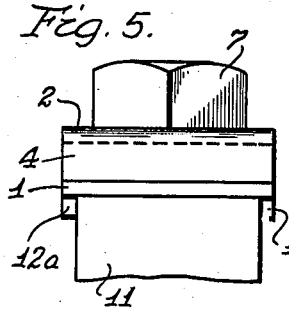
Fig. 5.
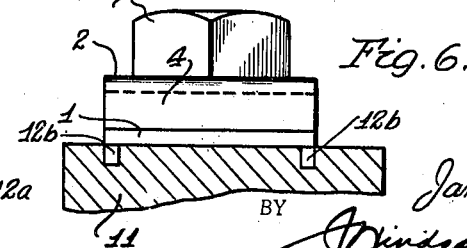
Fig. 6.
INVENTOR.
James P. Burke
BY
Windsor Davis
ATTORNEY.

Aug. 10, 1943.   J. P. BURKE   2,326,285
NUT RETAINER
Filed Nov. 23, 1938   2 Sheets-Sheet 2

INVENTOR.
James P. Burke
BY J. Hudson Davis
ATTORNEY.

Patented Aug. 10, 1943

2,326,285

UNITED STATES PATENT OFFICE 2,326,285

NUT RETAINER

James P. Burke, Knoxville, Tenn., assignor to F. L. McLaughlin, Detroit, Mich.

Application November 23, 1938, Serial No. 242,075

1 Claim. (Cl. 151—25)

This invention relates to lock washers and has for its object to provide a device of this type capable of acting through a substantial distance to maintain a nut in pressure engagement with the threads of a bolt.

Another object is to provide a lock washer for placement between a nut and a surface of greater area than the surface of the nut adjacent thereto, which will be deformed by the imposition of bending stresses therein and which will serve the dual function of maintaining pressure between the nut and the threads of a bolt and of constituting a frictional lock against rotation of the nut with respect to its bolt by snap action against the corners thereof.

A further object is to provide a lock washer composed of spring material bent upon itself and having openings through each leg or branch thereof to receive a bolt, the legs or branches being collapsible against each other under pressure from a nut to disalign the openings and to set up a frictional locking pressure with the threads of the bolt.

Another object is to provide a lock washer of such size as to extend substantially outwardly of the contour of the nut and which has its ends bent away from the nut so that a locking and slack take-up action will result from the bending thereof when pressure is imposed thereon by its nut. This washer has particular utility for use with materials, such as wood, which are expected to shrink while aging.

With the above and other ends in view the invention is more fully disclosed hereinafter with reference to the accompanying drawings, in which:

Fig. 1 is a plan view;

Fig. 2 is a side elevation illustrating the assembly prior to tightening of the nut;

Fig. 3 is an elevation illustrating the nut tightened;

Fig. 4 is a section of the device;

Fig. 5 is a fragmental transverse section illustrating one method of assembly of the device on the members to be held;

Fig. 6 is a fragmental transverse section illustrating another method of assembly of the device on the members to be held;

Figure 7:
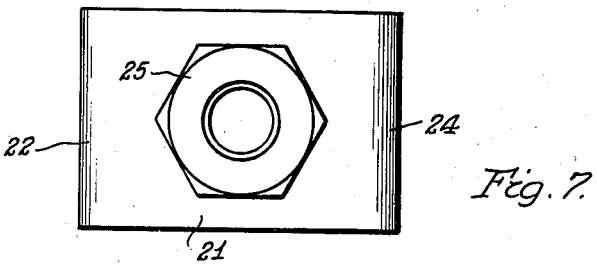
Fig. 7 is a plan of a modified device.
Figures 8, 9:
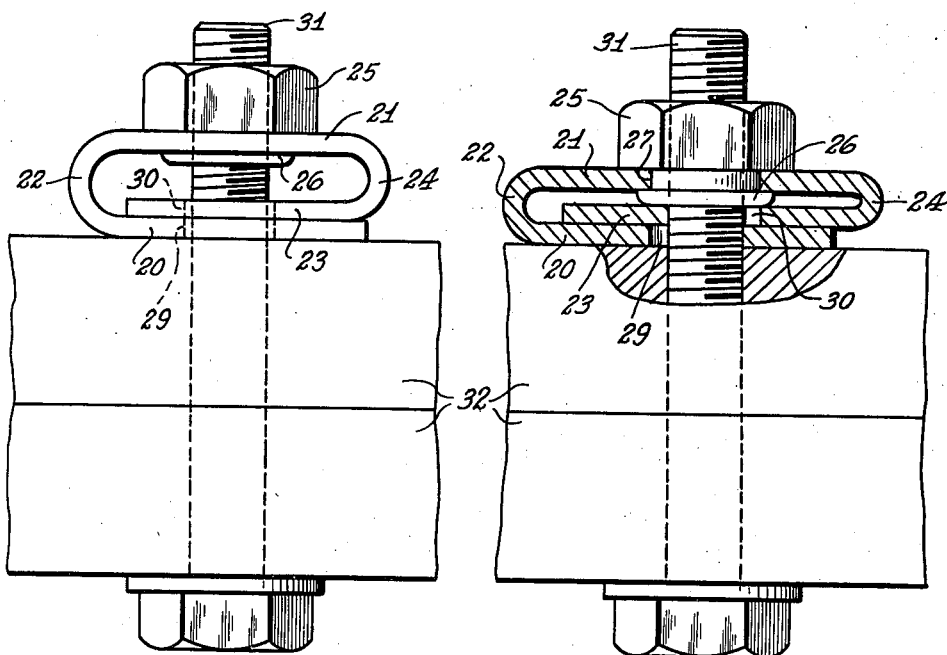
Fig. 8 is a side elevation illustrating the modified device prior to tightening of the nut.
Fig. 9 is a side elevation, partly in cross section, illustrating the device after tightening of the nut.
Figure 10:
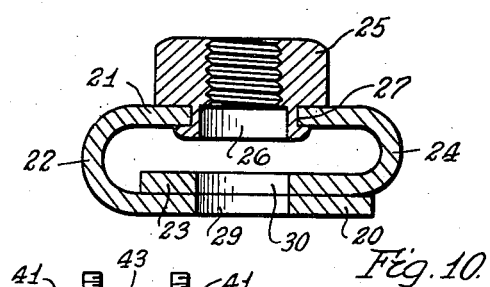
Fig. 10 is a cross-section of the modified device.

The present device comprises a strap-like blank of spring metal bent to provide two substantially parallel arms 1 and 2, the two arms being integrally united by an arcuately bent portion 3. The free end 4 of the arm 2 is bent substantially perpendicular to the main portion thereof and contacts the top surface of the arm 1.

The two arms 1 and 2 have aligned openings 5 and 6 therein, and a nut 7 has a tubular extension 8 extending through the opening 6 and retained therein by the turned over portion 9 of the tubular extension. The nut is free to rotate relative to the arm 2.

The nut 7 is screwed onto a bolt 10 extending through the members 11 which are to be secured together, and as the nut is tightened the arm 2 is deformed substantially as shown in Fig. 3. Due to deformation of the bent portions 3 and 4 a constant pressure is exerted in a direction to bind the members 11 tightly together, and in case of shrinkage or contraction of the members 11 the spring action maintains them in pressure contact. As illustrated, the arm 2 also becomes deformed and bends about the comparatively sharp corners of the nut, thereby inducing a high degree of friction between the nut and the arm 2 which opposes loosening or accidental removal of the nut.

The arm 1 is provided with perpendicular prongs 12 struck therefrom. In case the members to be secured together are of metal the prongs are spaced whereby they engage the sides of the adjacent member, as illustrated at 12a in Fig. 5. If the members to be secured are of wood, or of soft material similar to wood, the prongs may be imbedded in the material as illustrated at 12b in Fig. 6.

Referring to Figs. 7 to 10, inclusive, the present device is composed of a strap-like blank of spring metal having two spaced apart parallel arms 20 and 21 united by an integral arcuate portion 22. A third arm 23, contacting the arm 20, is united with the arm 21 by an integral arcuate portion 24, the two arms 20 and 23 being free to slide relative to each other.

A nut 25 has a tubular extension 26 received in an aperture 27 in the arm 21, and retained therein by an over-turned portion 28 on the tubular portion. In line with the axis of the nut 25 are apertures 29 and 30 in the arms 20 and 23 respectively. The apertures 29 and 30 are of a diameter larger than the screwthreaded opening in the nut.

The nut 25 is screwed onto a bolt 31 for holding a plurality of members 32 together, and as the arm 20 contacts the adjacent member 32 further tightening of the nut causes deformation of the arcuate portions 22 and 24. Deformation of the portions 22 and 24 sets up pressure conditions biasing outward movement or separation of the arms 20 and 23 with the result that the walls of the apertures 29 and 30 are moved into pressure contact with opposite sides of the bolt 31. This pressure contact creates friction which opposes removal of the nut, and the resilient pressure developed by deformation of the spring metal, in addition to maintaining the members 32 in pressure contact in the presence of contraction, also creates friction tending to prevent removal of the nut.

Figure 11:
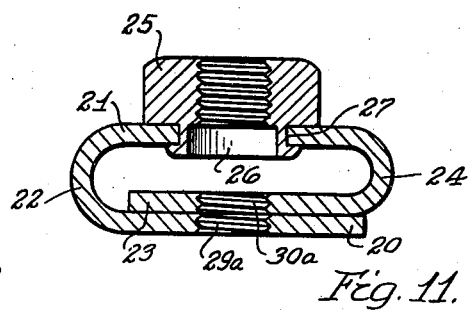
Fig. 11 is a section illustrating a further modification.

As shown in Fig. 11, apertures 29a and 30a, corresponding to the apertures 29 and 30, may be provided with screw threads of a pitch similar to the pitch of the threads in the nut.

Figure 12:
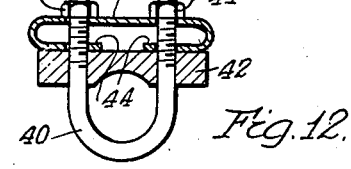
Fig. 12 is a section illustrating the invention in conjunction with a U-bolt.

In Fig. 12 there is illustrated a U-bolt 40 having nuts 41 on the screw threaded ends thereof. Between the nuts 41 and a pressure imposing member 42 is a device formed of a strip 43 of spring metal having its ends reversely bent to form arms 44. Apertures 45 are provided in the strip 43 and the arms 44 through which the U-bolt ends extend, and the arms are normally spaced from the strip in order that distortion through a substantial distance takes place upon tightening of the nuts.

In this latter form the nuts may be attached to the locking member similarly to the other forms, but in the case of dual nuts it is preferred that they be unsecured in order that one nut may be removed without removal of the other.

Although specific embodiments of the invention have been illustrated and described, it will be understood that various changes may be made within the scope of the appended claim without departing from the spirit of the invention, and such changes are contemplated.

What is claimed is:

A lock washer formed of spring metal having juxtaposed first and second arms in surface contact one with the other, a third arm spaced from the first two arms and substantially parallel therewith, all three arms having aligned apertures therein, integral rounded portions connecting opposite ends of the first two arms respectively to opposite ends of said third arm in such manner that distortion thereof caused by compression of the third arm toward the first two arms creates forces tending to cause outward sliding movement of the juxtaposed arms thereby to cause the walls of the apertures to bind against opposite sides of a bolt disposed in said apertures; and a nut rotatably retained in the aperture in the third arm.

JAMES P. BURKE.